United States Patent
Klipper et al.

(10) Patent No.: US 8,211,950 B2
(45) Date of Patent: Jul. 3, 2012

(54) AMPHOTERIC ION EXCHANGERS

(75) Inventors: Reinhold Klipper, Cologne (DE); Hans Karl Soest, Cologne (DE); Ulrich Litzinger, Hachenburg (DE); Michael Schelhaas, Cologne (DE); Georg Martin, Langenfeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 673 days.

(21) Appl. No.: 12/249,148

(22) Filed: Oct. 10, 2008

(65) Prior Publication Data

US 2009/0107918 A1 Apr. 30, 2009

(30) Foreign Application Priority Data

Oct. 24, 2007 (DE) .................. 10 2007 050 833

(51) Int. Cl.
C08J 5/20 (2006.01)
B01J 43/00 (2006.01)
(52) U.S. Cl. .............. 521/25; 210/660; 521/32
(58) Field of Classification Search .......... None
See application file for complete search history.

(56) References Cited

U.S. PATENT DOCUMENTS

| | | | |
|---|---|---|---|
| 3,586,646 A | 6/1971 | Corte et al | 260/2.2 R |
| 3,637,535 A | 1/1972 | Corte et al. | 260/2.1 |
| 4,232,125 A | 11/1980 | Buske | 521/32 |
| 4,419,245 A | 12/1983 | Barrett et al. | 210/681 |
| 4,427,794 A | 1/1984 | Lange et al. | 521/28 |
| 4,444,961 A | 4/1984 | Timm | 526/88 |
| 5,068,419 A | 11/1991 | Kulprathipanja et al. | 562/580 |
| 5,231,115 A | 7/1993 | Harris | 521/28 |
| 6,696,503 B2 | 2/2004 | Happ et al. | 521/30 |
| 7,053,129 B1 | 5/2006 | Klipper et al. | 521/32 |
| 7,241,918 B1 | 7/2007 | Kulprathipanja | 562/584 |
| 7,462,286 B2 | 12/2008 | Klipper et al. | 210/681 |
| 2007/0241056 A1 * | 10/2007 | Klipper et al. | 210/660 |

OTHER PUBLICATIONS

Helfferich, von; lonenaustauscher (Ion Exchanges), vol. 1, 1959, p. 52; "Amphotere Ionenaustauscher".
Bolto, Pawlowski; Wastewater Treatment by Ion-Exchange "Ion Exchange Materials" (1986) p. 5
Stach; Angewante Chemie, 63, (1951), pp. 263-266 Bewertung von Ionen-Austauschern unter bes. Berucksichtigung ihrer Austauschgeschwindigkeiten.
Bolto, Pawlowski; "Wastewater Treatment by Ion-Exchange". (1987) pp. 51 ff.; Recovery of Mineral Acids and their Salts. J. R.
Millar et al; J. Chem Soc. (1963); pp. 218-225 "Solvent-modified Polymer Networks: Part I. The Preparation and Characterisation of Expanded-network and Macroporous Styrene-Divinylbenzene Copolymers and their Sulphonates".
Organikum (organic chemistry) VEB Deutscher Verlag der Wissenschaften, Berlin, 1968 $8^{th}$ Ed. p. 479.
Khalikova, V.K. et al: "Amphoteric ion exchangers produced from poly(vinylbenzylphthalimide) And some of their properties". (1988) XP-002511658.

* cited by examiner

*Primary Examiner* — Krishnan S Menon
*Assistant Examiner* — Katherine Zalasky
(74) *Attorney, Agent, or Firm* — Nicanor A. Kohncke

(57) ABSTRACT

The present invention relates to novel amphoteric ion exchangers which possess not only phthalamide groups of the formula (I)

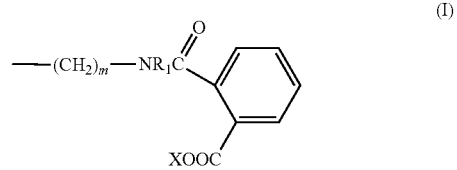

but also —$(CH_2)_m NR_1 R_2$ groups and/or if appropriate —$(CH_2)_m NR_1 R_2 R_3$ groups, wherein m is an integer from 1 to 4 and $R_1, R_2, R_3$ in each case independently of one another are hydrogen, —$CH_3$, —$CH_2 CH_3$, —$CH_2 CH_2 CH_3$, benzyl, —$OCH_2 CH_3$ or —$CH_2 CH_2 OH$ and X is H or Na or K, to a process for production thereof and also use thereof.

8 Claims, 2 Drawing Sheets

AMPHOTERIC ION EXCHANGERS

The present invention relates to novel amphoteric ion exchangers which possess not only phthalamide groups of the formula (I)

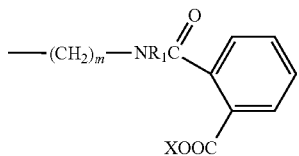

(I)

but also —$(CH_2)_m NR_1 R_2$ groups and/or if appropriate —$(CH_2)_m NR_1 R_2 R_3$ groups, wherein m is an integer from 1 to 4 and $R_1$, $R_2$, $R_3$ in each case independently of one another are hydrogen, —$CH_3$, —$CH_2CH_3$, —$CH_2CH_2CH_3$, benzyl, —$OCH_2CH_3$ or $CH_2CH_2OH$ and X is H or Na or K, to a process for production thereof and also use thereof.

BACKGROUND OF THE INVENTION

In principal, amphoteric ion exchangers are distinguished in that they comprise acidic and basic functional groups next to one another. Processes for production thereof are described in Helfferich Tonenaustauscher [ion exchangers], volume 1 page 52, Verlag Chemie, Weinheim or in Bolto, Pawlowski, Wastewater Treatment, Spon, London, 1986, page 5.

Stach, Angewandte Chemie, 63, 263, 1951 describes amphoteric ion exchangers which comprise strongly basic and strongly acidic groups next to one another. These amphoteric ion exchangers are produced by copolymerization of styrene, vinyl chloride and a crosslinker such as, for example, divinylbenzene, followed by quaternization and sulfonation.

DE-A 10353534 describes amphoteric ion exchangers which comprise not only weakly acidic but also weakly basic groups next to one another. As weakly basic groups, mention is made of primary amino groups, as weakly acidic groups, mention is made of acrylic acid and alkyl($C_1$-$C_4$) acrylic acid groups such as, for example, methacrylic acid.

All of said amphoteric ion exchangers share the fact that they are not very suitable for complex separation processes, in particular for chromatographic separation processes. Their slow kinetics, low selectivity and separation efficiency are generally insufficient therefor.

It was therefore the object of the present invention to develop novel amphoteric ion exchangers which exhibit good separation efficiency, sufficiently rapid kinetics and high selectivity and also stability, in particular in separations of organic mono-, di- or polycarboxylic acids from aqueous solutions, in particular fermentation broths.

SUMMARY OF THE INVENTION

The present application relates to amphoteric ion exchangers which possess not only phthalamide groups of the formula (I)

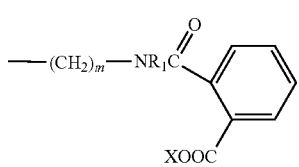

(I)

but also —$(CH_2)_m NR_1 R_2$ groups and/or if appropriate —$(CH_2)_m NR_1 R_2 R_3$ groups, wherein m is an integer from 1 to 4 and $R_1$, $R_2$, $R_3$ in each case independently of one another are hydrogen, —$CH_3$, —$CH_2CH_3$, —$CH_2CH_2CH_3$, benzyl, —$OCH_2CH_3$ or $CH_2CH_2OH$ and X is H or Na or K.

The present invention also relates to a process for producing amphoteric ion exchangers which comprise not only phthalamidic acid groups of the formula (I) but also —$(CH_2)_m$ $NR_1R_2$ groups and/or if appropriate —$(CH_2)_m$ $NR_1R_2R_3$ groups, where m, $R_1$, $R_2$, $R_3$ and X have the above-mentioned meanings, which comprises a) reacting monomer droplets of a mixture of at least one monovinylaromatic compound, at last one polyvinylaromatic compound, an initiator or an initiator combination, and also if appropriate a porogen, to give crosslinked polymer beads, b) amidomethylating the resultant crosslinked polymer beads with phthalimide derivatives, c) reacting the phthalimidomethylated polymer beads with a substoichiometric amount of saponification reagent and isolating them, or if appropriate d) reacting the amphoteric ion exchanger from step c) which comprises not only phthalamidic acid groups of the formula (I) but also —$(CH_2)_m NR_1 NR_2$ groups with alkylating agents or hydroxy alkylating agents, and isolating it.

The amphoteric ion exchangers obtained in this manner comprise, as acid group, the phthalamidic acid group of the formula (I), and as basic groups, primary, secondary, tertiary, quaternary amino or ammonium groups. The amphoteric ion exchangers according to the invention preferably comprise primary amino groups as basic groups.

Without the process step d), in an alternatively preferred embodiment of the present invention, non-alkylated amphoteric ion exchangers are obtained which possess not only phthalamide groups of the formula (I) but also —$(CH_2)_m$ $NR_1R_2$ groups and/or, if appropriate, —$(CH_2)_m NR_1 R_2 R_3$ groups, where m is an integer from 1 to 4, X is H or K or Na, and $R_1$, $R_2$ and $R_3$ are in each case only hydrogen.

In the light of the prior art, it was surprising that these novel amphoteric ion exchangers can be synthesized in a simple reaction and exhibit a significantly improved separation efficiency of organic carboxylic acids such as citric acid, lactic acid or tartaric acid from aqueous solutions, in particular fermentation broths, compared with the prior art (U.S. Pat. Nos. 7,241,918 or 5,068,419), in which anion exchangers having weakly or strongly basic groups are used.

In addition, the amphoteric ion exchangers according to the invention can be used in ion retardation processes—see Bolto, Pawlowski, Wastewater treatment by Ion Exchange pages 51 ff., Spon, New York 1987.

The amphoteric ion exchangers according to the invention can possess not only a heterodisperse particle size distribution but also a monodisperse particle size distribution. According to the invention, preferably, use is made of monodisperse amphoteric ion exchangers. Their particle size is generally 250 to 1250 µm, preferably 280-600 µm.

In the present application, those ion exchangers or their precursor the polymer beads are designated as monodisperse in which the uniformity coefficient of the distribution curve is less than or equal to 1.2. The quotient of the quantities d60 and d10 is designated as uniformity coefficient. D60 describes the diameter at which 60% by mass in the distribution curve are smaller and 40% by mass are greater than or equal to. D10 designates the diameter at which 10% by mass in the distribution curve are smaller and 90% by mass are greater than or equal to.

The production of monodisperse ion exchangers is known in principle to those skilled in the art. A differentiation is made between fractionating heterodisperse ion exchangers by sieving in essentially two direct production processes, namely jetting and the seed-feed process in the production of the precursors, the monodisperse polymer beads. In the case of the seed-feed process, a monodisperse feed is used which itself can be generated, for example, by sieving or by jetting.

According to the invention, monodisperse amphoteric ion exchangers obtainable by jetting are preferably used for separating off organic mono-, di- or polycarboxylic acids from fermentation broths, in particular for separating off citric acid from fermentation broths.

The monodisperse polymer beads underlying the monodisperse amphoteric ion exchangers can already be produced by these known processes such as, for example, fractionation, jetting, or by the seed-feed technique.

The monodisperse polymer bead, the precursor of the ion exchanger, can be produced, for example, by reacting monodisperse, if appropriate encapsulated, monomer drops comprising a monovinylaromatic compound, a polyvinylaromatic compound, a monovinylalkyl compound, and also an initiator or initiator mixture and, if appropriate, a porogen in aqueous suspension. In order to obtain macroporous polymer beads for producing macroporous ion exchangers, the presence of porogen is obligatorily necessary. This is because according to the invention not only gel-type but also macroporous monodisperse amphoteric ion exchangers can be used for chromatographic separation processes, in particular separating off organic homo-, di- or polycarboxylic acids from aqueous solutions, in particular fermentation broths. In a preferred embodiment of the present invention, use is made of monodisperse amphoteric ion exchangers, for the production of which use is made of monodisperse polymer beads with the use of microencapsulated monomer droplets. The various production processes of monodisperse polymer beads are known to those skilled in the art from the prior art both by the jetting principle and also by the seed-feed principle. At this point, reference may be made to U.S. Pat. No. 4,444,961, EP-A 0 046 535, U.S. Pat. No. 4,419,245 and WO 93/12167.

As monovinylaromatic unsaturated compounds in process step a), use is made of compounds such as styrene, vinyltoluene, ethylstyrene, alpha-methylstyrene, chlorostyrene or chloromethylstyrene.

As polyvinylaromatic compounds (crosslinker), use is made of aliphatic or aromatic compounds bearing divinyl groups. These include divinylbenzene, divinyltoluene, trivinylbenzene, ethylene glycol dimethacrylate, trimethylolpropane trimethacrylate, 1,5-hexadiene, 1,7-octadiene, 2,5-dimethyl-1,5-hexadiene and also divinyl ethers. The polyvinylaromatic compounds are used in amounts of 0.5% by weight to 80% by weight, based on the entire monomer amount used—preferably 4-20% by weight, particularly preferably 5-10% by weight.

Suitable divinyl ethers are compounds of the general formula (I),

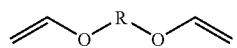

(I)

where
R is a radical of the series $C_nH_{2n}(C_mH_{2m}-O)_p-C_mH_{2m}$ or $CH_2-C_6H_4-CH_2$ and $n \geq 2$, $m=2$ to $8$ and $p \geq 2$.

Suitable polyvinyl ethers for the case n>2 are trivinyl ethers of glycerol, trimethylolpropane or tetravinyl ethers of pentaerythritol.

Preferably, use is made of divinyl ethers of ethylene glycol, di-, tetra- or polyethylene glycol, butanediol or poly-THF or the corresponding tri- or tetravinyl ethers. Particular preference is given to the divinyl ethers of butanediol and diethylene glycol, as described in EP-A 11 10 608.

The desired macroporous property alternatively preferred for the gel-type property is given to the ion exchanger in process step a). The addition of what is termed porogen is obligatorily necessary for this. The association of ion exchangers and their macroporous structure is described in German examined application DE 1045102 (1957) and German examined application DE 1113570 (1957). As porogen for the production of macroporous polymer beads to be used according to the invention in order to obtain macroporous amphoteric ion exchangers, suitable substances are especially organic substances which dissolve in the monomer, that dissolve or swell poorly in the polymer. Examples which may be mentioned are aliphatic hydrocarbons such as octane, isooctane, decane, isododecane. In addition substances which are very suitable are alcohols having 4 to 10 carbon atoms, such as butanol, hexanols or octanol.

In addition to the monodisperse gel-type amphoteric ion exchangers, according to the invention, use is preferably made, therefore, of monodisperse amphoteric ion exchangers having macroporous structure for separating off organic mono-, di- or polycarboxylic acids from fermentation broths, in particular for separating off citric acid from fermentation broths.

The expression "macroporous" is known to those skilled in the art. Details are described, for example in J. R. Millar et al. J. Chem. Soc. 1963, 218. The macroporous ion exchangers have a pore volume determined by mercury porosimetry of 0.1 to 2.2 ml/g, preferably 0.4 to 1.8 ml/g.

The functionalization of the polymer beads obtainable after process step a) to give monodisperse, amphoteric ion exchangers is performed as a modification of the phthalimide process known from the prior art as described, for example, in U.S. Pat. No. 7,053,129, the contents of which are hereby incorporated in their entirety in the present application. This is because subject matter of U.S. Pat. No. 7,053,129 is a process for producing monodisperse anion exchangers by a) reacting monomer droplets of at least one monovinylaromatic compound and at least one polyvinylaromatic compound and also if appropriate a porogen and/or if appropriate an initiator or an initiator combination to give a monodisperse, crosslinked polymer bead, b) amidomethylating this monodisperse, crosslinked polymer bead with phthalimide derivatives, c) reacting the amidomethylated polymer bead to give aminomethylated polymer bead and d) finally alkylating the aminomethylated polymer bead.

The parameters described in the process of U.S. Pat. No. 7,053,129 led to a complete elimination of the phthalic acid residue as salt of phthalic acid and thereby to exposure of the $-(CH_2)_mNH_2$ group. This proceeds via treatment of the phthalimidomethylated, crosslinked polymer bead with superstoichiometric amounts of aqueous or alcoholic solutions of an alkali metal hydroxide such as sodium hydroxide or potassium hydroxide.

The phthalimide process thus enables the production of aminoalkyl-containing crosslinked polymer beads having a substitution of the aromatic nuclei greater than 1.

In the process according to the invention for producing amphoteric ion exchangers having phthalamidic acid groups, the reaction of monodisperse polymer beads with phthalimide derivatives to give phthalimidomethylated polymer beads in process step b) proceeds by the process described in U.S. Pat. No. 7,053,129.

Surprisingly, it has now been found that, in contrast to U.S. Pat. No. 7,053,129, only a partial exposure of the —$(CH_2)_m$NH$_2$ group with simultaneous formation of phthalamidic acid groups in process step c) proceeds when the phthalimidomethylated polymer beads are treated substoichiometrically, or with a deficit, of saponification reagents. Deficit, for the purposes of the present invention, means an amount of saponification reagents, here acids or lyes, which does not lead to the complete elimination of the phthalic acid residue.

This is achieved by using a smaller amount of saponification reagent, based on the amount of saponification agents required for complete saponification, which is generally at least twice the amount based on the nitrogen content in the phthalimidomethylated polymer bead. The molar ratio of nitrogen—in the phthalimidomethylated polymer bead—to saponification reagent should be less than 1:2.0, preferably 1:1.95 to 1:0.1, particularly preferably 1:1.9 to 1:1.1.

Per ml of phthalimidomethylated polymer bead, in process step c) use is preferably made of 0.5-3 ml of saponification agents, particularly preferably 0.8-1.5 ml of saponification agents, per ml of phthalimidomethylated polymer bead, based on the above specified molar ratios.

The treatment of the phthalimidomethylated polymer bead with the saponification agent proceeds in process step c) preferably in the temperature range of 90° C. to 220° C., particularly preferably in the range of 140° C. to 190° C.

As saponification agents, in process step c), use is preferably made of mineral acids, particularly preferably sulfuric acid, hydrochloric acid, or alkali metal hydroxides, particularly preferably sodium hydroxide solution or potassium hydroxide—or other basic saponification agents.

The saponification agents are used in liquid form, preferably as aqueous solutions.

Use is preferably made according to the invention of sodium hydroxide solution.

In process step d), the amphoteric ion exchangers according to the invention are produced by reacting the polymer bead with aminomethyl groups and phthalamidic acid groups in suspension with alkylating agents.

Preferred alkylating agents for the purposes of the present invention are alkyl halides, haloalcohols, alkyl sulfates, dialkyl sulfates, alkyloxides, Leuckart-Wallach reagents or combinations of these alkylating agents with one another or successively.

Particularly preferably, use is made of chloromethane, ethylene oxide, propylene oxide, chloroethanol and also the Leuckart-Wallach reagents or their combination. By way of example, Leuckart-Wallach reagents are described in Organikum [organic chemistry], VEB Deutscher Verlag der Wissenschaften, Berlin 1968, 8th edition, page 479.

Based on the molar amount of nitrogen present in the ion exchangers according to the invention, use is preferably made of 0.1-6 mol of alkylating agent, particularly preferably 1-4 mol of alkylating agent.

As suspension medium, use is made of water or organic solvents. However, if appropriate, depending on the desired product, bases can also be added. Preferably, water is used. As bases, if appropriate sodium hydroxide solution, potassium hydroxide solution or basic, but not nucleophilic, amines come into consideration.

The process step d) is carried out at temperatures of 20 to 150° C., preferably of 40 to 110° C. Process step d) is carried out at pressures from atmospheric pressure to 6 bar, preferably at atmospheric pressure to 4 bar.

According to the invention, for separating off organic mono-, di- or polycarboxylic acids from fermentation broths, in particular for separating off citric acid from fermentation broths, use is preferably made of monodisperse, amphoteric ion exchangers produced by the phthalimide process. Their degree of substitution is preferably up to 1.6, i.e. per aromatic nucleus, on a statistical average up to 1.6 hydrogen atoms are substituted by methylphthalimide groups. By the phthalimide process with subsequent substoichiometric saponification, therefore, high capacity post-crosslinking-free amphoteric ion exchangers having phthalamidic acid groups and basic groups can be produced which are used for separating off organic mono-, di or polycarboxylic acids from fermentation broths, in particular for separating off citric acid from fermentation broths.

Isolating for the purposes of the present invention means, in the production process step c) and d), separating off the ion exchanger from the aqueous suspension and its purification. It is separated off according to the measures known to those skilled in the art such as decanting, centrifuging, filtering. The purification proceeds by washing with, for example, deionized water, and can comprise classification for separating off fine fractions or coarse fractions. If appropriate, the resultant amphoteric ion exchanger can be dried, preferably by reduced pressure and/or particularly preferably at temperatures between 20° C. and 180° C.

Not only the amphoteric ion exchangers obtainable by process step c), but also the amphoteric ion exchangers obtainable by process step d) are suitable for the use according to the invention for separating off organic mono-, di- or polycarboxylic acids from fermentation broths, in particular for separating off citric acid from fermentation broths. According to the invention, particularly suitable ion exchangers for this are the amphoteric ion exchangers obtainable by process step c).

The present invention therefore also relates to the use of the amphoteric ion exchangers for separating off mono-, di- or polycarboxylic acids or amino acids from aqueous solutions, in particular fermentation broths. Preferred acids to be separated off according to the invention are lactic acid, citric acid, acetic acid, propionic acid, malic acid, gibberilic acid or amino acids, here preferably lysine, threonine or alanine.

The amphoteric ion exchangers to be used according to the invention are used for this purpose preferably in devices suitable for their tasks.

The invention therefore also relates to devices through which a liquid to be treated can flow, preferably filtration units, particularly preferably adsorption vessels, in particular filter adsorption vessels, which are packed with the amphoteric ion exchangers according to the invention.

Methods of Analysis

Determination of the Amount of Basic Aminomethyl Groups in the Aminomethylated Crosslinked Polystyrene Polymer Bead 100 ml of aminomethylated polymer beads are vibrated on the tap volumeter and subsequently flushed into a glass column with demineralized water. In the course of 1 hour and 40 minutes, 1000 ml of 2% strength by weight sodium hydroxide solution are filtered through. Subsequently, demineralized water is filtered through until 100 ml of eluate admixed with phenolphthalein have a consumption of 0.1 n (0.1 normal) hydrochloric acid of at most 0.05 ml.

50 ml of this resin are admixed in a glass beaker with 50 ml of demineralized water and 100 ml of 1 n hydrochloric acid. The suspension is stirred for 30 minutes and subsequently packed into a glass column. The liquid is drained off. A further 100 ml of 1 n hydrochloric acid is filtered through the resin in the course of 20 minutes. Subsequently, 200 ml of methanol are filtered through. All eluates are collected and combined and titrated against methyl orange with 1 n sodium hydroxide solution.

The amount of aminomethyl groups in 1 liter of aminomethylated resin is calculated from the following formula: (200−V)·20=mol of aminomethyl groups per liter of resin, where V is the volume of the 1 n sodium hydroxide solution consumed in the titration.

Determination of the Amount of Phthalamidic Acid Groups in the Amphoteric Ion Exchanger 5000 ml of an aqueous solution which comprises 392.9 grams of $CuSO_4.5H_2O$ are produced.

60 ml of amphoteric ion exchanger are packed into a glass column. In the course of 2 hours, 50 ml of 4% strength by weight sodium hydroxide solution are filtered through. Then, 250 ml of demineralized water are filtered through in the course of 1 hour.

Of the resultant amount of resin, 50 ml are packed into a glass column. In the course of 4 hours, 1000 ml of the aqueous copper sulfate solution are filtered through the resin. The eluate is collected. Subsequently, 100 ml of demineralized water are filtered through the resin. The eluate is collected. Both eluates are combined. In the combined eluate, the content of copper is analyzed. The difference between the amount of copper applied and the amount of copper analyzed in the total eluate is equal to the amount of copper which is taken up by the resin.

The molar amount of copper taken up by 50 ml of amphoteric ion exchanger is equivalent to the molar amount of phthalamidic acid groups in 50 mol of amphoteric ion exchanger.

50 ml of amphoteric ion exchanger contain x mol of phthalamidic acid groups.

1000 ml of amphoteric ion exchanger contain 40×x mol of phthalamidic acid groups.

Demineralized water, for the purposes of the present invention, has a conductivity of 0.1 to 10 μS, wherein the content of dissolved or undissolved metal ions is no greater than 1 ppm, preferably no greater than 0.5 ppm, for Fe, Co, Ni, Mo, Cr, Cu as individual components and is no greater than 10 ppm, preferably no greater than 1 ppm, for the sum of said metals.

It will be understood that the specification and examples are illustrative but not limitative of the present invention and that other embodiments within the spirit and scope of the invention will suggest themselves to those skilled in the art.

EXAMPLES

Example 1

Production of an Amphoteric Ion Exchanger Having Phthalamidic Acid Groups and Primary Amino Groups 1a) Production of Monodisperse Macroporous Polymer Beads Based on Styrene, Divinylbenzene and Ethylstyrene 3000 g of demineralized water were charged into a 10 l glass reactor and a solution of 10 g of gelatin, 16 g of disodium hydrogenphosphate dodecahydrate and 0.73 g of resorcinol in 320 g of demineralized water were added and mixed thoroughly. The mixture was heated to 25° C. Subsequently, a mixture of 3200 g of microencapsulated monomer droplets having a narrow particle size distribution of 3.6% by weight divinylbenzene and 0.9% by weight ethylstyrene (used as commercially available isomeric mixture of divinylbenzene and ethyl styrene having 80% divinylbenzene), 0.5% by weight dibenzoyl peroxide, 56.2% by weight styrene and 38.8% by weight isododecane (technical isomeric mixture having a high fraction of pentamethylheptane) was added with stirring, wherein the microcapsules comprised a formaldehyde-cured complex coaciate of gelatin and a copolymer of acrylamide and acrylic acid, and 3200 g of aqueous phase having a pH of 12 were added. The median particle size of the monomer droplets was 260 μm.

The batch was polymerized to completion with stirring by temperature elevation according to a temperature program starting at 25° C. and ending at 95° C. The batch was cooled, washed over a 32 μm sieve and subsequently dried in a vacuum at 80° C. This produced 1893 g of a spherical polymer having a median particle size of 250 μm, narrow particle size distribution and smooth surface.

The polymer was chalky white in appearance and had a bulk density of approximately 350 g/l.

1b) Production of Amidomethylated Polymer Beads 2825 ml of dichloroethane, 529.7 g of phthalimide and 368.7 g of 29.9% by weight formalin were charged at room temperature. The pH of the suspension was adjusted to 5.5 to 6 using sodium hydroxide solution. Subsequently the water was removed by distillation. Then, 38.8 g of sulfuric acid were added. The resultant water was removed by distillation. The batch was cooled. At 30° C., 141.9 g of 65% strength oleum and subsequently 424.4 g of monodisperse polymer beads produced by process step 1a) were added. The suspension was heated to 70° C. and stirred for a further 6 hours at this temperature. The reaction broth was taken off, demineralized water was added and residual amounts of dichloroethane were removed by distillation.

Yield of amidomethylated polymer beads: 1920 ml

Elemental Composition:

| | |
|---|---|
| carbon: | 77.1% by weight; |
| hydrogen: | 5.3% by weight; |
| nitrogen: | 4.8% by weight; |
| remainder: | oxygen. |

1c) Reaction of The Amidomethylated Polymer Beads to Give an Amphoteric Ion Exchanger Having Phthalamidic Acid Groups and Primary Amino Groups The molar ratio of NaOH of the saponification sodium hydroxide solution to nitrogen in the amidomethylated polymer beads was 1.9 to 1

321.1 ml of 50% strength by weight sodium hydroxide solution and 1389 ml of demineralized water were added to 1900 ml of amidomethylated polymer beads from 1b) at room temperature. The suspension was heated to 180° C. in the course of 2 hours and stirred for 8 hours at this temperature. The resultant polymer beads were washed with demineralized water.

Yield: 1920 ml

Determination of the amount of basic groups: 1.42 mol/liter of resin

Determination of the amount of phthalamidic acid groups: 0.816 mol/liter of resin

Example 2

Production of an Amphoteric Ion Exchanger Having Phthalamidic Acid Groups and Tertiary Amino Groups 2b) Production of Amidomethylated Polymer Beads 2354 ml of dichloroethane, 441.4 g of phthalimide and 306.3 g of 30.0% by weight formalin were charged at room temperature. The pH of the suspension was adjusted to 5.5 to 6 using sodium hydroxide solution. Subsequently the water was removed by distillation. Then, 32.4 g of sulfuric acid were added. The resultant water was removed by distillation. The batch was cooled. At 30° C., 118.2 g of 65% strength oleum and subsequently 318.3 g of monodisperse polymer beads produced by process step 1a) were added. The suspension was heated to 70° C. and stirred for a further 6 hours at this temperature. The reaction broth was taken off by means of vacuum, demineralized water was added and residual amounts of dichloroethane were removed by distillation.

Yield of amidoimethylated polymer beads: 1540 ml
Composition by Elemental Analysis:

| | |
|---|---|
| carbon: | 77.1% by weight; |
| hydrogen: | 4.9% by weight; |
| nitrogen: | 5.0% by weight; |

2c) Reaction of the Amidomethylated Polymer Beads to Give an Amphoteric Ion Exchanger Having Phthalamidic Acid Groups and Primary Amino Groups The molar ratio of NaOH of the saponification sodium hydroxide solution to nitrogen in the amidomethylated polymer beads was 1.9:1

257.1 ml of 50% strength by weight sodium hydroxide solution and 1555 ml of demineralized water were added to 1510 ml of amidomethylated polymer beads from 2a) at room temperature. The suspension was heated to 180° C. in the course of 2 hours and stirred at this temperature for 8 hours. The resultant polymer beads were washed with demineralized water.

Yield of aminomethylated polymer beads: 1750 ml
Composition by Elemental Analysis:

| | |
|---|---|
| nitrogen: | 6.8% by weight |
| carbon: | 76.6% by weight; |
| hydrogen: | 6.7% by weight; |
| oxygen: | 11.3% by weight |
| sodium: | 0.17% by weight |

Determination of the amount of basic groups: 0.97 mol/liter of resin
Determination of the amount of phthalamidic acid groups: 0.436 mol/liter of resin 2d) Reaction of the Amidomethylated Polymer Beads to Give an Amphoteric Ion Exchanger Having Phthalamidic Acid Groups and Tertiary Dimethylamino Groups.

653 ml of demineralized water were charged into a reactor at room temperature. To this were added 435 ml of polymer beads from example 2b) and thereafter 93 gams of 30% strength by weight aqueous formalin solution. The suspension was heated to 40° C. The pH of the suspension was adjusted to pH 3 by addition of 85% strength by weight formic acid. Then, the mixture was heated to 55° C. and stirred for a further 30 minutes at 55° C. Subsequently, the mixture was heated to 70° C. and stirred for a further 30 minutes at 70° C. It was heated to 80° C. and stirred for a further 30 minutes at 80° C. Subsequently the mixture was heated to 97° C. During the entire heat-up phase, the pH was kept at pH 3 by addition of formic acid. After stirring for 30 minutes at 97° C., the pH was adjusted to pH 2 by addition of 50% strength by weight sulfuric acid. The mixture was stirred at pH 2 for 30 minutes. Subsequently, by addition of 50% strength by weight sulfuric acid, the pH was adjusted to pH 1 and the mixture was stirred for a further 8.5 hours at this pH and 97° C.

In total, 50 grams of formic acid 85% strength were added.

After the suspension was cooled, the resultant polymer beads were filtered on a sieve and washed with demineralized water.

Yield: 520 ml

The polymer beads were packed into a column. From the top, the first 2000 ml of 4% strength by weight sodium hydroxide solution, and subsequently 2000 ml of demineralized water were filtered through.

Yield: 420 ml
Composition by Elemental Analysis:

| | |
|---|---|
| nitrogen: | 6.9% by weight |
| carbon: | 80.2% by weight; |
| hydrogen: | 7.8% by weight; |
| oxygen: | 9.8% by weight |
| sodium: | 0.17% by weight |

Determination of the amount of basic groups: 0.98 mol/liter of resin

Example 3

Production of an Amphoteric Ion Exchanger Having Phthalamidic Acid Groups and Quaternary Ammonium Groups Reaction of the amphoteric ion exchanger having phthalamidic acid groups and primary amino groups to give an amphoteric ion exchanger having phthalamidic acid groups and quaternary ammonium groups 640 ml of demineralized water and 400 ml of polymer beads from example 2b) were charged into a reactor at room temperature. To this were added 74.5 gram of 50% strength by weight sodium hydroxide solution. Subsequently, 25.5 grams of chloromethyl were added. The suspension was heated to 40° C. and stirred at this temperature for a further 16 hours.

After the suspension was cooled, the resultant polymer beads were filtered off on a sieve and washed with demineralized water.

Yield: 440 ml
Composition by Elemental Analysis:

| | |
|---|---|
| nitrogen: | 6.3% by weight |
| carbon: | 76.3% by weight; |
| hydrogen: | 7.2% by weight; |
| oxygen: | 11.9% by weight |

Example 4

Separation of an Aqueous Mixture of Glucose and Citric Acid Using an Amphoteric Ion Exchanger which Comprises Phthalamidic Acid Groups and Primary Amino Groups Preparation:

500 ml of the resin obtainable from example 1c) were filtered into a glass column. 600 ml of 10% strength by weight aqueous sulfuric acid were filtered through the resin and the resin was subsequently washed to neutrality using demineralized water. Thereafter, the resin was in the sulfate form.

The resin was packed into the glass column which was preheated to 70° C. and placed on the vibration bench (diameter 25 mm, length 1000 mm), which glass column was heated by a heating jacket. Level of the resin in the column 81 cm=400 ml of resin In the course of this, any air bubbles occurring were driven upwards supported by the vibration. The column was packed to a height of 81 cm (=400 ml of resin).

As soon as the resin ceased to compact, the feed piston was inserted. Care was taken to ensure that air above the surface could escape through the feed line of the piston. Then 4 bed volumes of sulfuric acid (w=0.2%) were pumped through the resin.

Chromatography:

Using the injection syringe, 5 ml of a solution of 40% by weight citric acid; 10% by weight glucose; 1% by weight sulfuric acid and 49% by weight water were injected into the feed line of the column. The line was connected to the peristaltic pump and the mixture was pumped through the resin bed with sulfuric acid (W=0.2%) at 25 ml/min. The effluent was collected in fractions of 25 ml (=1 in cycle). The individual fractions were subsequently analyzed by HPLC for their content of glucose and citrate.

Figure 1:
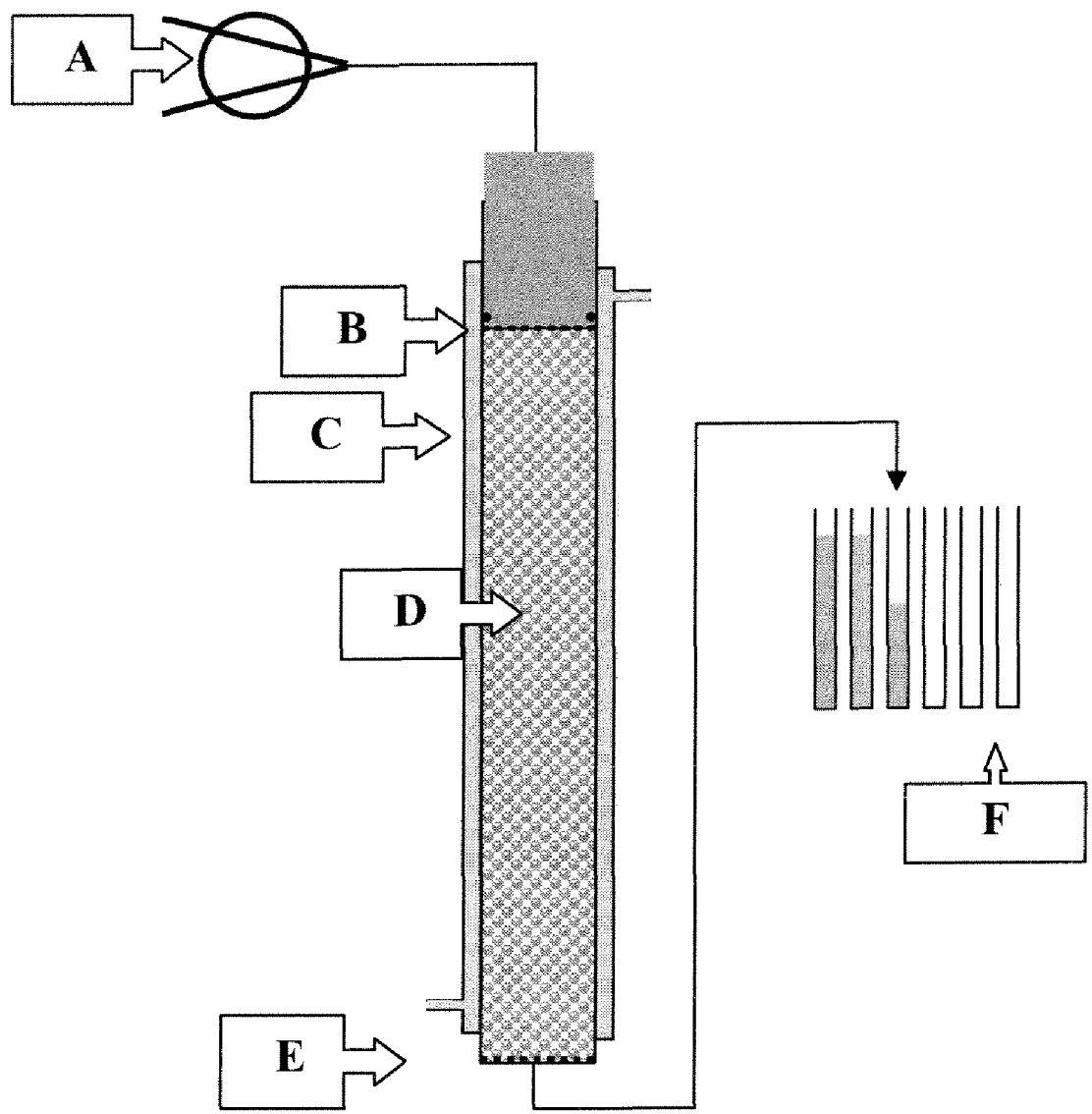
FIG. 1 shows a setup for example 4, where A=peristaltic pump, B=feed piston, C=heating jacket, D=resin packing, E=sinter plate and F=fraction collector.
Figure 2:
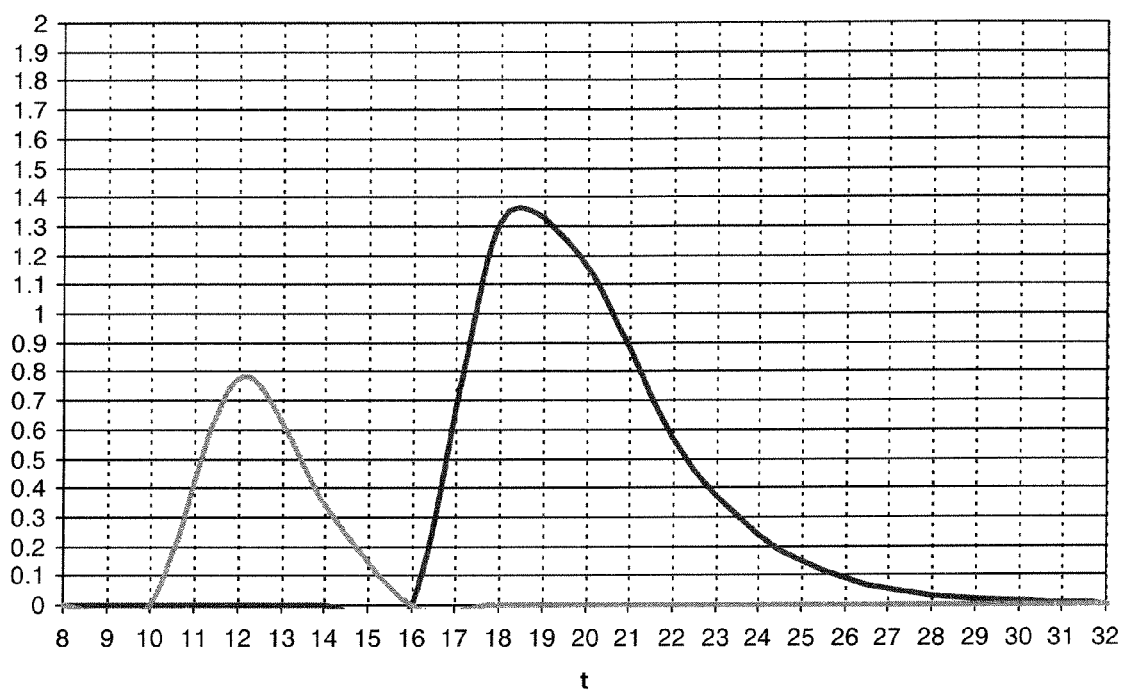
FIG. 2 shows the separation of a glucose-citric acid mixture using the amphoteric ion exchanger from example 1c), where R=resolution, t=time in minutes.

Surprisingly, the use of the ion exchangers according to the invention leads to a sharp separation of the individual components from the glucose-citric acid mixture, wherein in the first runnings (8-16 min) the glucose is collected and the citric acid does not then leave the column until the tails (16-30 min).

What is claimed is:

1. A process for producing an amphoteric ion exchanger, comprising the steps of:
   a) reacting monomer droplets of a mixture of at least one monovinylaromatic compound, at least one polyvinylaromatic compound, an initiator or an initiator combination, thereby forming crosslinked polymer beads,
   b) amidomethylating the crosslinked polymer beads with phthalimide derivatives, thereby forming phthalimidomethylated polymer beads,
   c) reacting the phthalimidomethylated polymer beads with a substoichiometric amount of a saponification reagent, thereby forming a product mixture, wherein the substioichomitric amount of the molar ratio of the phthalimidomethylated polymer bead to said saponification reagent is less than 1: 2.0; and
   d) isolating the amphoteric ion exchanger from the product mixture.

2. The process as claimed in claim 1, wherein
   d) instead of isolating the amphoteric ion exchanger from the product mixture as provided in step d), the product mixture is reacted with alkylating agents or hydroxyalkylating agents and, thereafter, isolating the amphoteric ion exchanger.

3. The process as claimed in claim 1, wherein step c) is carried out in the temperature range from 90° C. to 220° C.

4. The process as claimed in claim 1, wherein step c), further comprises use of 0.5-3 mL of saponification reagents per mL of phthalimidomethylated polymer bead.

5. The process as claimed in claim 1, wherein mineral acid or alkali metal hydroxides are added as saponification reagents.

6. The process according to claim 1, wherein the reacting step a) further comprises a porogen.

7. The process according to claim 1, wherein the substioichomitric amount of the molar ratio of the phthalimidomethylated polymer bead to said saponification reagent is 1:1.95 to 1:0.1.

8. The process according to claim 1, wherein the substioichomitric amount of the molar ratio of the phthalimidomethylated polymer bead to said saponification reagent is 1:1.9 to 1:1.1.

* * * * *